(12) United States Patent
Tokoro

(10) Patent No.: US 6,323,802 B1
(45) Date of Patent: Nov. 27, 2001

(54) RADAR APPARATUS FOR VEHICLE

(75) Inventor: Setsuo Tokoro, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/433,788

(22) Filed: Nov. 3, 1999

(30) Foreign Application Priority Data

Nov. 4, 1998 (JP) .................................................. 10-313283

(51) Int. Cl.$^7$ .............................. G01S 13/93; G01S 7/02; G01S 13/60
(52) U.S. Cl. .................................................. 342/70; 342/71
(58) Field of Search ........................ 342/70, 71; 340/903

(56) References Cited

U.S. PATENT DOCUMENTS

| | | | |
|---|---|---|---|
| 5,670,963 | * | 9/1997 | Kubota et al. .......................... 342/70 |
| 5,734,344 | | 3/1998 | Yamada . |
| 5,793,325 | * | 8/1998 | Yamada ................................... 342/70 |

FOREIGN PATENT DOCUMENTS

| | | |
|---|---|---|
| 3314 363 | 4/1983 | (DE) . |
| 6-174821 | 6/1994 | (JP) . |
| 9-145833 | 6/1997 | (JP) . |

* cited by examiner

Primary Examiner—Ian J. Lobo
(74) Attorney, Agent, or Firm—Finnegan, Henderson, Farabow, Garrett & Dunner, L.L.P.

(57) ABSTRACT

A radar apparatus for use on a vehicle has a radar beam scanning mechanism for scanning a scan area with a radar beam substantially in parallel to a road surface on which the vehicle is running, and an object detector for receiving reflected waves of the radar beam to create a detected object image, based on the reflected waves. The object detector is provided with a ghost determination device for determining whether a detected object image created is a ghost. Therefore, the radar apparatus can eliminate a detected object image determined as a ghost out of detected object images created.

16 Claims, 4 Drawing Sheets

RADAR APPARATUS FOR VEHICLE

BACKGROUND OF THE INVENTION

1. Field of the Invention

The present invention relates to a radar apparatus for use on a vehicle, which is used while being mounted on a vehicle, and, more particularly, to a scanning on-vehicle radar apparatus arranged to scan a scanning area with a radar beam and detect an object in the scanning area accurately without an error.

2. Related Background Art

An example of the scanning on-vehicle radar apparatus is the "scanning radar apparatus for use on vehicle" disclosed in Japanese Patent Application Laid-open No. 9-145833. This radar apparatus is provided with measures for accurately detecting individual objects, based on a history of detected data.

SUMMARY OF THE INVENTION

This conventional apparatus is, however, provided with no countermeasures against improper detection called a ghost.

The ghost is a result of improper detection of an absent object as if to exist. In other words, the ghost is a detected object image having no corresponding object existing actually.

This ghost is created by a sidelobe of the radar beam.

Signal intensities of reflected waves from an object existing in a direction of the sidelobe of the radar beam are sufficiently weaker than those of reflected waves from an object existing in a direction of the main lobe of the radar beam.

Therefore, the reflected waves of low signal intensities are normally ignored on the occasion of creating the detected object image, whereby the detected object image can be created substantially using only the reflected waves from the object in the main lobe.

However, if there exists an object with relatively high reflectance in the direction of the sidelobe the apparatus can receive the reflected waves strong enough to recognize it as an effective object in some cases. In such cases, the radar apparatus recognizes that there exists the object in the direction of the main lobe. Namely, the ghost appears in the direction of the main lobe.

For avoiding it, it is conceivable to employ an antenna forming as small sidelobes as possible. In general, the greater the antenna size, the smaller the sidelobes. However, the compact and lightweight structure is an important factor for the radar apparatus for use on the vehicle, and there is a limit to increase of the antenna size.

There were thus desires for the on-vehicle radar apparatus without improper detection based on the ghost and without increase in the antenna size.

Particularly, where the detection result of the radar apparatus is utilized for automatic tracking control or the like, it is important to remove the ghost appearing ahead on the currently running lane, and there were thus desires for the on-vehicle radar apparatus that can accomplish it.

The present invention has been accomplished in order to solve the above problem, and a radar apparatus of the present invention comprises radar beam scanning means for scanning a scan area with a radar beam substantially in parallel to a road surface on which a vehicle is running, and object detecting means for receiving reflected waves of the radar beam and creating a detected object image, based on the reflected waves, wherein the object detecting means comprises ghost determination means for determining whether a detected object image created is a ghost.

Thanks to provision of the ghost determination means, it becomes possible to remove a detected object image determined as a ghost from detected object images created.

The ghost determination means is desirably one for determining whether a first detected object image is a ghost, based on a second detected object image. The first detected object image stated herein is a detected object image appearing at a position assumed to be on the currently running lane, and the second detected object image is a detected object image appearing at a position assumed to be on an adjacent lane to the currently running lane.

The size and direction of each sidelobe to the main lobe are defined corresponding to the antenna used. Therefore, supposing that the first detected object image is a ghost originating in an object on another lane (adjacent lane), a predetermined relation can be established between the position, the relative velocity, etc. of the existing object on the adjacent lane, which produces the ghost, and the position, the relative velocity, etc. of the ghost.

Then the ghost determination means can determine that the first detected object image is a ghost in a high probability when the first detected object image satisfies a predetermined relation to the second detected object image.

Particularly, when the distance and relative velocity of the second detected object image are approximately equal to the distance and relative velocity, respectively, of the first detected object image, there is a high probability that the first detected object image is a ghost. Therefore, this is desirably employed as a necessary condition to determine that the first detected object image is a ghost.

In addition, the first detected object image is a ghost in a high probability when an angle between the direction of the first detected object image and the direction of the second detected object image is within a predetermined range. Therefore, this is desirably adopted as a necessary condition to determine that the first detactad object image is a ghost.

Further, there is a probability that the first detected object image is a ghost, if the distance of the first detected object image is in a predetermined range. Therefore, this is desirably adopted as a necessary condition to determine that the first detected object image is a ghost.

Moreover, it is desirable to carry out the object detection process without interruption and determine that the first detected object image is not a ghost, with a higher priority than the other determination conditions, when it is determined that the first detected object image is the same as the detected object image in the preceding detection process.

This means that the ghost determination is admitted only when the first detected object image emerges suddenly. This can considerably lower the probability of misjudging an actually existing object as a ghost.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
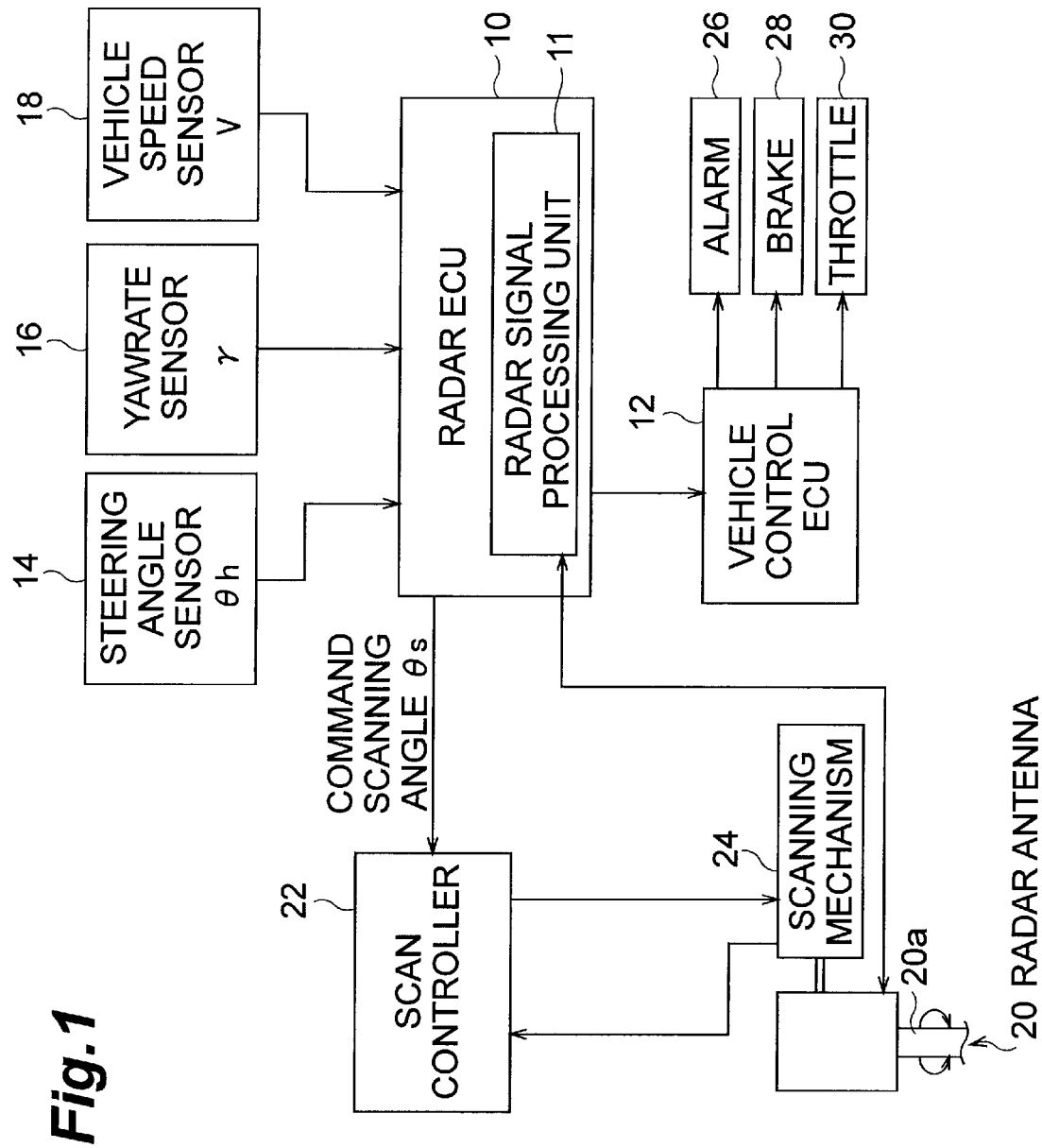
FIG. 1 is a block diagram to show a system configuration of an on-vehicle radar apparatus as an embodiment of the present invention.

FIG. 1 is the system configuration diagram to show the on-vehicle radar apparatus as an embodiment of the present invention. This on-vehicle radar apparatus is a scanning FM-CW (frequency-modulated continuous wave) radar apparatus for carrying out scanning with a radar beam using a mechanical scanning mechanism and is controlled by an electronic control unit for radar (ECU for radar) 10 and an electronic control unit for control of vehicle (ECU for vehicle control) 12.

Connected to the radar ECU 10 are a steering angle sensor 14, a yaw rate sensor 16, and a vehicle speed sensor 18. The steering angle sensor 14 generates a signal according to a steering angle of the steering wheel (steering angle signal θh). The yaw rate sensor 16 generates a signal according to an angular velocity of rotation about the gravity center of the vehicle (yaw rate signal γ). The vehicle speed sensor 18 generates a signal according to a vehicle speed (vehicle speed signal V).

The radar ECU 10 is provided with the function of estimating the shape of the currently running lane, based on the steering angle signal θh, the yaw rate signal γ, and the vehicle speed signal V.

Also connected to the radar ECU 10 are a radar antenna 20 and a scan controller 22. The radar ECU 10 is provided with a radar signal processing unit 11, and the radar antenna 20 acts to transmit a triangular-frequency-modulated signal generated in the radar signal processing unit 11 and receive a return signal resulting from reradiation of the transmitted signal at the object.

The received signal is mixed with the transmitted signal in the radar signal processing unit 11 to generate a beat signal. The distance and relative velocity of the object are computed from the frequency of this beat signal. Since computation algorithms of distance and relative velocity are commonly known ones in the FM-CW radar apparatus, the detailed description thereof is omitted herein.

The radar antenna 20 has directivity and, in order to scan the scan area with the main lobe of the radar beam approximately in parallel to the road surface, the radar antenna 20 is mounted on a rotational shaft 20a extending in the vertical direction and provided near the front grille of the vehicle, for example. The radar antenna 20 is capable of being rotated about this rotational shaft 20a.

The rotational shaft 20a is connected to a scanning mechanism 24. The scanning mechanism 24 is a device for rotating the radar antenna 20 in a predetermined angular range and is subjected to feedback control by the scan controller 22.

The scan controller 22 accepts supply of a scanning angle signal from the radar ECU 10. The scan controller 22 performs the feedback control of the scanning mechanism 24 so that the scanning angle of the radar antenna 20 (the angle indicating the direction of the main lobe) agrees with a command scanning angle θs from the radar ECU 10. The radar ECU 10 increases and decreases the command scanning angle θs in predetermined cycles so that the radar beam from the radar antenna 20 scans a predetermined detection area in front of the vehicle at predetermined speed.

The radar ECU 10 executes the above processing over signals supplied from the radar antenna 20, thereby detecting the distance and relative velocity of an object (vehicle) existing in directions of scanning angles. This detection operation is executed continuously with successively varying the scanning angles, to recognize any object existing in the detection area in front of the vehicle, and the result of recognition is supplied to the vehicle control ECU 12.

Connected to the vehicle control ECU 12 are an alarm 26, a brake 28, and a throttle 30. When this vehicle control ECU 12 recognizes that there exists an object in the predetermined range in front of the vehicle, based on the information from the radar ECU 10, it activates the alarm 26 to call vehicle-occupant's attention or actuates the brake 28 or the throttle 30 so as to decelerate the vehicle, according to preset logic.

Meanwhile, the radar ECU 10 of this radar apparatus has the function of detecting a ghost appearing on the currently running lane with high accuracy and judging improper detection of an object due to the ghost.

Figure 2:
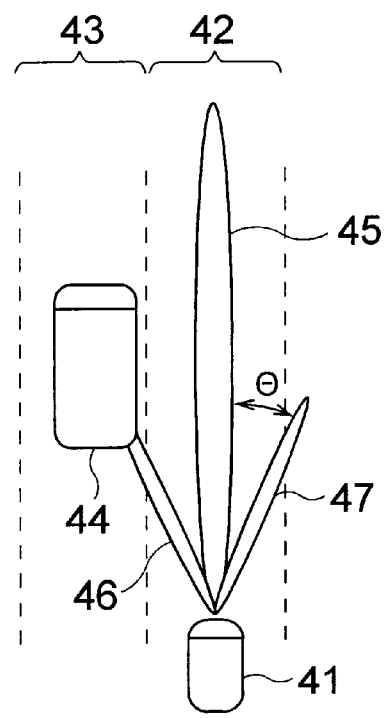
FIG. 2 is a diagram for explaining how a ghost appears on the currently running lane in the object detection by the on-vehicle radar apparatus of the embodiment.
Figure 3:
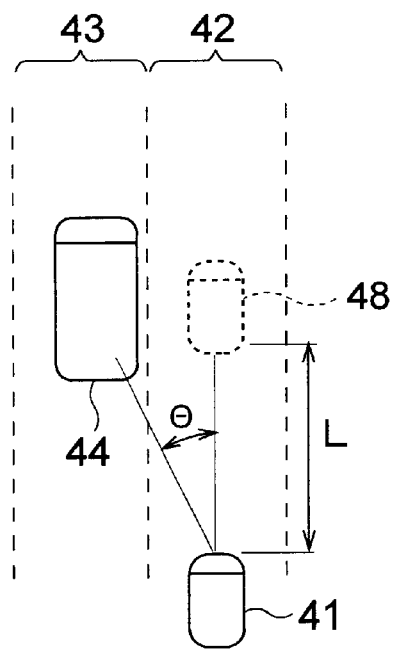
FIG. 3 is a diagram for explaining how a ghost appears on the currently running lane in the object detection by the on-vehicle radar apparatus of the embodiment.

FIG. 2 and FIG. 3 are the diagrams for explaining appearance of the ghost. The both figures show a state in which a vehicle 41 equipped with the radar apparatus of the present embodiment is running on a currently running lane 42 and a large vehicle 44 is running ahead on an adjacent lane 43.

FIG. 2 shows an antenna beam pattern wherein the main lobe 45 is directed forward in the currently running lane and sidelobes 46 and 47 appear in respective directions of an angle θ on the both left and right sides of the main lobe 45. In this example the large vehicle 44 on the left adjacent lane 43 is in the sidelobe 46. The directions and shape of the sidelobes 46, 47 to the main lobe 45 are uniquely determined depending upon the structure, the size, etc. of the antenna.

The radar apparatus mounted on the vehicle 41 cannot judge directly whether received signals are based on reradiation from the object in the main lobe 45 or based on reradiation from the object in the sidelobes 46, 47. Generally speaking, the levels of the received signals based on reradiation from the object in the sidelobes are much smaller than those of the received signals based on reradiation from the object in the main lobe. Therefore, a detected object image can be created normally based on only the received signals based on reradiation from the object in the main lobe, by ignoring the levels of the received signals smaller than a reference value or, in other words, by carrying out the object detection using only the levels of the received signals at or above the reference value.

However, if there exists an object with high reflectance in the sidelobe 46 like the large vehicle 44 in this example, the radar apparatus can receive the reflected and received signals over the reference value from the object in certain cases. In such cases, a detected object image is created based on the received signals and the radar apparatus will determine that the object must be in the main lobe 45.

Explaining this referring to FIG. 2 and FIG. 3, the radar apparatus determines as if the object exists in the direction of the main lobe 45 or in the direction of the currently running lane 42, because of the presence of the large vehicle 44 running on the adjacent lane 43. The detected object image thus created improperly is called a ghost, and in this example the ghost 48 appears because of the presence of the large vehicle 44.

Figure 4:
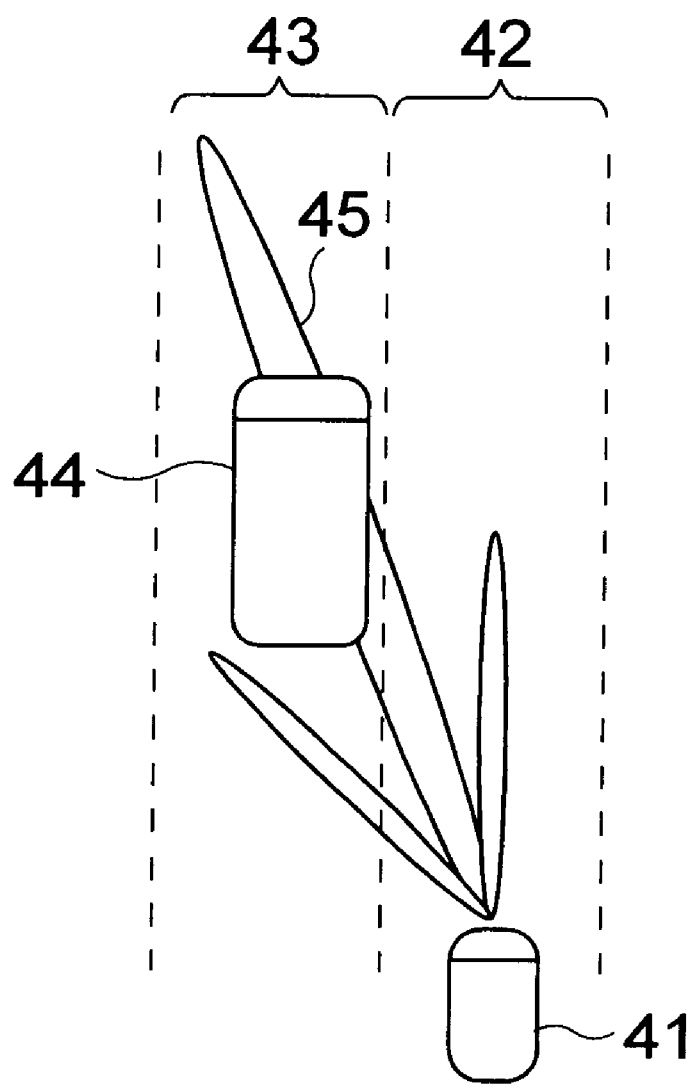
FIG. 4 is a diagram for explaining how to detect an object on an adjacent lane in the object detection by the on-vehicle radar apparatus of the embodiment.

The large vehicle 44, which can cause the appearance of the ghost, is detected correctly by the scanning main lobe 45, as illustrated in FIG. 4. Therefore, the ghost 48 emerges as an image to indicate a vehicle running in parallel to the large vehicle 44.

Since the on-vehicle radar apparatus of the present embodiment is constructed in such structure that the radar ECU 10 carries out the ghost determination process after the object detection and eliminates the ghost on the currently running lane, based on the result of the ghost determination process, its object detection accuracy is very high.

Figure 5:
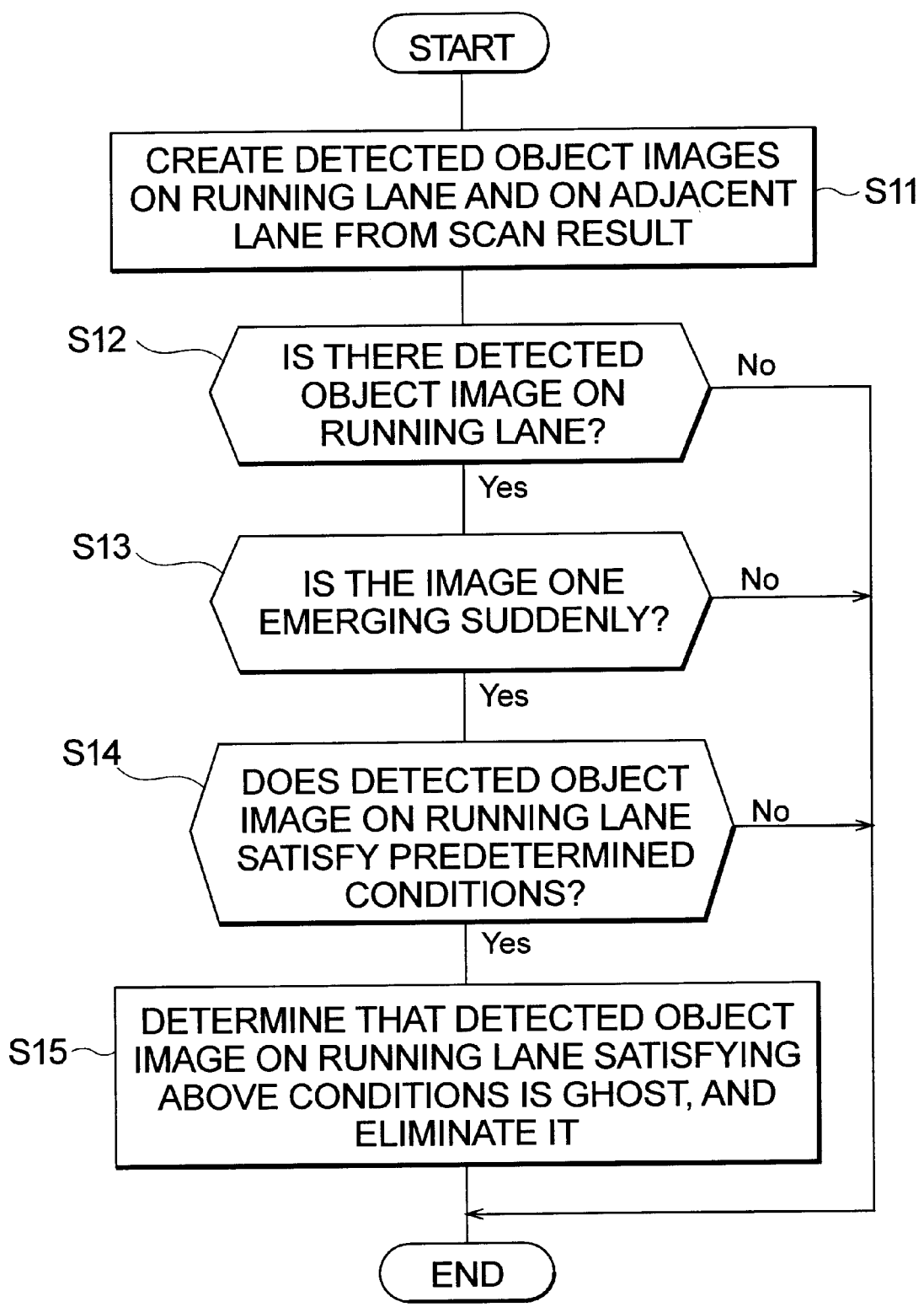
FIG. 5 is a flowchart of the object detection process carried out in ECU for radar in the on-vehicle radar apparatus of the embodiment.

FIG. 5 is a flowchart to show the object detection process carried out with one antenna beam scan, including the ghost determination process. This object detection process is carried out repeatedly every scan, whereby the radar apparatus can track positional change of the detected object.

Step S11 is the normal object detection process to scan the predetermined angular range ahead of the vehicle 41 with the antenna beam and detect any object existing in the predetermined area or create a detected object image thereof. The detected object image stated herein does not mean a visible image on a display device, but represents the general name of data concerning the distance, the direction, etc. of the object. This radar apparatus is the scanning FM-CW radar apparatus which can create the detected object image indicating the distance, the relative velocity, and the direction of the object by commonly known detection processing.

Step S12 and steps thereafter concern the ghost determination process, and step S12 is to determine whether the detected object image is created in the currently running lane 42. The reason is that the ghost determination process herein is carried out for the purpose of detecting the ghost on the currently running lane. Therefore, when no object is detected on the currently running lane in step S11, or, in other words, when no detected object image is created on the currently running lane, the object detection process in this scan is terminated without execution of the ghost determination process.

When the object is detected on the currently running lane in step S11, the ECU moves from step S12 to step S13.

Step S13 is to determine whether the detected object image on the currently running lane is one emerging suddenly. When it can be recognized that the detected object image created in this scan and the detected object image created in the previous scan are those related to the same object, the ECU determines that the detected object image is not a ghost, but an image based on an actually existing object, and skips the ghost determination process thereafter. On the other hand, when it is recognized as a suddenly emerging object, the ECU moves to step S14, because it is likely to be a ghost.

Whether the detected object image in the present scan and the detected object image in the previous scan are based on the same object can be determined on the basis of the position, the speed, and the size. For example, if the detected object image in the previous scan and the detected object image in the present scan have equal size and speed and if the position in the present scan agrees with the position that can be predicted from the position and speed in the previous scan, it can be determined that the detected object images are based on the same object.

Step S14 is to determine whether the detected object image on the currently running lane satisfies all the following conditions 1 to 4, which are necessary conditions for determining the detected object image as a ghost.

Condition 1: The distance to the detected object image on the currently running lane is within a predetermined range, for example, in the range of 20 m to 40 m.

Since the sidelobes are sufficiently smaller than the main lobe, the sidelobes cannot detect a far object on the adjacent lanes. On the other hand, states of detecting an object on adjacent lanes at close range by the sidelobes are circumstances where the direction of the main lobe greatly deviates from the direction of the currently running lane. Therefore, the ghosts on the currently running lane due to detection of the object on the adjacent lanes by the sidelobes emerge in the range except for the far and close ranges. This range needs to be properly set according to the directivity of the antenna or the like.

Condition 2: There exists a detected object on the adjacent lane.

Since the purpose is to eliminate the ghost appearing because of detection of the object on the adjacent lane by the sidelobe, a major premise for the object on the currently running lane to be a ghost is that there exists a detected object on the adjacent lane.

Condition 3: As to the detected object image on the currently running lane and the detected object image on the adjacent lane, both distances and relative velocities indicated thereby are approximately equal and an angle between the two detected object images is within a predetermined range, for example, in the range of 5° to 7°.

Since the ghost is the result of detection of the object on the adjacent lane by the sidelobe, the result should be equal as to the distance and relative velocity to the result of detection of the object on the adjacent lane by the main lobe. Further, the angle between the direction of the ghost and the direction of the object on the adjacent lane being the cause of the ghost should be approximately equal to the angle between the main lobe and the sidelobe.

Condition 4: As to two detected object images in the relation satisfying condition 3, the reflection intensity of the object on the adjacent lane is sufficiently greater than that of the object on the currently running lane.

For example, the reflection intensity of the object on the adjacent lane is five or more times greater than that of the object on the currently running lane.

The reflection intensity upon detection of one object by the main lobe is sufficiently greater than that upon detection by the sidelobe. Therefore, if the difference is small between them to the contrary, there is little likelihood that the detected object image on the currently running lane is a ghost.

When the above four conditions all are met, there is a very high probability that the detected object image on the currently running lane is a ghost, and the ECU thus transfers to step S15 to determine that the detected object is a ghost by the sidelobe and eliminate the detected object image from detection targets while recognizing it as an image due to improper detection. Namely, a detected object image left after the above operation is regarded as an image indicating an existing object.

The determination step of step S14 may also be modified as follows; the factors of each condition are expressed by respective functions in terms of likelihood of being a ghost and the determination that the condition is met is made if all the likelihoods are not less than a predetermined value or if the product of those likelihoods is not less than a predetermined value.

For example, condition 3 can be handled as follows; the likelihoods of being a ghost as to the distance, the relative velocity, and the angle are expressed by respective functions of difference between the detected object image on the currently running lane and the detected object image on the adjacent lane and it is determined that the condition is satisfied, if the product of the likelihoods of the respective factors (distance difference, relative velocity difference, and angle) is not less than a predetermined value.

It can also be contemplated that the likelihood that the object on the currently running lane is a ghost is determined using the fuzzy inference based on the parameters of the distance difference, the relative velocity difference, the angle, etc. between the detected object image on the currently running lane and the detected object image on the adjacent lane.

Although the on-vehicle radar apparatus of the present embodiment employs the mechanical scanning, it may be replaced by electronical scanning such as DBF (digital beam forming) or the like.

The on-vehicle radar apparatus of the present embodiment is designed to carry out the object detection process every scan with the antenna beam, but the apparatus may also be adapted to carry out the object detection process every two or more scans.

As described above, since the on-vehicle radar apparatus according to the present invention is provided with the ghost determination means, the detected object image determined as a ghost can be eliminated from all detected object images created. Therefore, the apparatus can detect the object with accuracy and can perform effective vehicle control and warning to the occupant, based on the detection result.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A radar apparatus which is to be mounted on a vehicle, comprising:
    radar beam scanning means for scanning a scan area with a radar beam substantially in parallel to a road surface on which said vehicle is running; and
    object detecting means for receiving reflected waves of said radar beam to create a detected object image, based on the reflected waves;
    wherein said object detecting means comprises ghost determination means for determining whether a detected object image created is a ghost, and
    wherein said ghost determination means determines, based on a second detected object image, whether a first detected object image is a ghost, if there exists a predetermined spatial relation between said first detected object image and said second detected object image.

2. The radar apparatus according to claim 1,
    wherein said first detected object image is a detected object image appearing at a position assumed to be a position on a currently running lane, and
    wherein said second detected object image is a detected object image appearing at a position assumed to be a position on an adjacent lane to said currently running lane.

3. A radar apparatus to be mounted on a vehicle comprising:
    radar beam scanning means for scanning a scan area with a radar beam substantially in parallel to a road surface on which said vehicle is running; and
    object detecting means for receiving reflected waves of said radar beam to create a detected object image, based on the reflected waves;
    wherein said object detecting means comprises ghost determination means for determining whether a detected object image created is a ghost
    wherein said ghost determination means comprises means for determining whether a first detected object image is a ghost, based on a second detected object image;
    wherein said first detected object image is a detected object image appearing at a position assumed to be a position on a currently running lane, and
    wherein said second detected object image is a detected object image appearing at a position assumed to be a position on an adjacent lane to said currently running lane; and
    wherein said ghost determination means determines that said first detected object image is a ghost, based on a necessary condition that a distance and a relative velocity indicated by said first detected object image are substantially equal respectively to those indicated by said second detected object image.

4. The radar apparatus according to claim 2,
    wherein said ghost determination means determines that said first detected object image is a ghost, based on a necessary condition that an angle between a direction indicated by said first detected object image and a direction indicated by said second detected object image is in a predetermined range.

5. The radar apparatus according to claim 3,
    wherein said ghost determination means determines that said first detected object image is a ghost, based on a necessary condition that an angle between a direction indicated by said first detected object image and a direction indicated by said second detected object image is in a predetermined range.

6. The radar apparatus according to claim 3,
    wherein said ghost determination means determines that said first detected object image is a ghost, based on a necessary condition that the distance indicated by said first detected object image is in a predetermined range.

7. The radar apparatus according to claim 4,
    wherein said ghost determination means determines that said first detected object image is a ghost, based on a necessary condition that the distance indicated by said first detected object image is in a predetermined range.

8. The radar apparatus according to claim 5,
    wherein said ghost determination means determines that said first detected object image is a ghost, based on a necessary condition that the distance indicated by said first detected object image is in a predetermined range.

9. The radar apparatus according to claim 1, wherein said object detecting means comprises a means for creating said detected object image every radar beam scan or every two or more radar beam scans by said radar beam scanning means, and wherein said ghost determination means is adapted so that when it can be determined that a first detected object image created is an image indicating the same object as a first detected object image created in a previous operation, the ghost determination means determines that the first detected object image is not a ghost, with a higher priority than other determination conditions.

10. A radar apparatus to be mounted on a vehicle comprising:

radar beam scanning means for scanning a scan area with a radar beam substantially in parallel to a road surface on which said vehicle is running; and object detecting means for receiving reflected waves of said radar beam to create a detected object image, based on the reflected waves;

wherein said object detecting means comprises ghost determination means for determining whether a detected object image created is a ghost wherein said ghost determination means comprises means for determining whether a first detected object image is a ghost, based on a second detected object image;

wherein said first detected object image is a detected object image appearing at a position assumed to be a position on a currently running lane, and wherein said second detected object image is a detected object image appearing at a position assumed to be a position on an adjacent lane to said currently running lane;

wherein said object detecting means comprises means for creating said detected object image every radar beam scan or every two or more radar beam scans by said radar beam scanning means, and wherein said ghost determination means is adapted so that when it can be determined that a first detected object image created is an image to indicate the same object as a first detected object image created in a previous operation, the ghost determination means determines that the first detected object image is not a ghost, with a higher priority than other determination conditions.

11. The radar apparatus according to claim 3, wherein said object detecting means is means for creating said detected object image every radar beam scan or every two or more radar beam scans by said radar beam scanning means, and wherein said ghost determination means is adapted so that when it can be determined that a first detected object image created is an image to indicate the same object as a first detected object image created in a previous operation, the ghost determination means determines that the first detected object image is not a ghost, with a higher priority than other determination conditions.

12. The radar apparatus according to claim 4, wherein said object detecting means is means for creating said detected object image every radar beam scan or every two or more radar beam scans by said radar beam scanning means, and wherein said ghost determination means is adapted so that when it can be determined that a first detected object image created is an image to indicate the same object as a first detected object image created in a previous operation, the ghost determination means determines that the first detected object image is not a ghost, with a higher priority than other determination conditions.

13. The radar apparatus according to claim 5, wherein said object detecting means is means for creating said detected object image every radar beam scan or every two or more radar beam scans by said radar beam scanning means, and wherein said ghost determination means is adapted so that when it can be determined that a first detected object image created is an image to indicate the same object as a first detected object image created in a previous operation, the ghost determination means determines that the first detected object image is not a ghost, with a higher priority than other determination conditions.

14. The radar apparatus according to claim 6, wherein said object detecting means is means for creating said detected object image every radar beam scan or every two or more radar beam scans by said radar beam scanning means, and wherein said ghost determination means is adapted so that when it can be determined that a first detected object image created is an image to indicate the same object as a first detected object image created in a previous operation, the ghost determination means determines that the first detected object image is not a ghost, with a higher priority than other determination conditions.

15. The radar apparatus according to claim 7, wherein said object detecting means is means for creating said detected object image every radar beam scan or every two or more radar beam scans by said radar beam scanning means, and wherein said ghost determination means is adapted so that when it can be determined that a first detected object image created is an image to indicate the same object as a first detected object image created in a previous operation, the ghost determination means determines that the first detected object image is not a ghost, with a higher priority than other determination conditions.

16. The radar apparatus according to claim 8, wherein said object detecting means is means for creating said detected object image every radar beam scan or every two or more radar beam scans by said radar beam scanning means, and wherein said ghost determination means is adapted so that when it can be determined that a first detected object image created is an image to indicate the same object as a first detected object image created in a previous operation, the ghost determination means determines that the first detected object image is not a ghost, with a higher priority than other determination conditions.

* * * * *